No. 828,454.
PATENTED AUG. 14, 1906.
D. A. BRENNAN.
SAFETY DEVICE FOR MACHINERY.
APPLICATION FILED JULY 18, 1905.
2 SHEETS—SHEET 1.
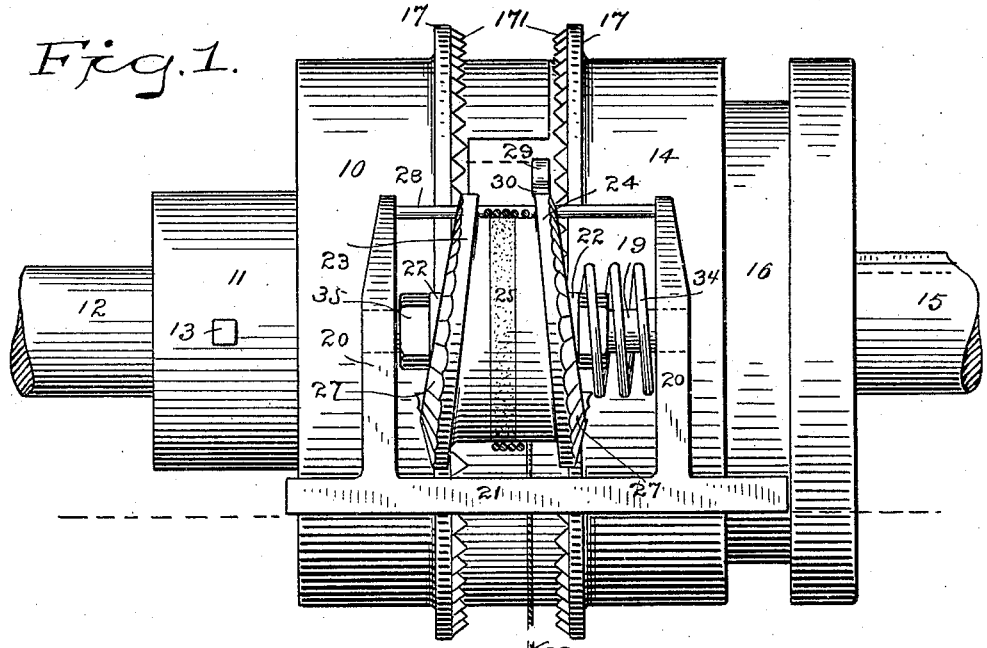
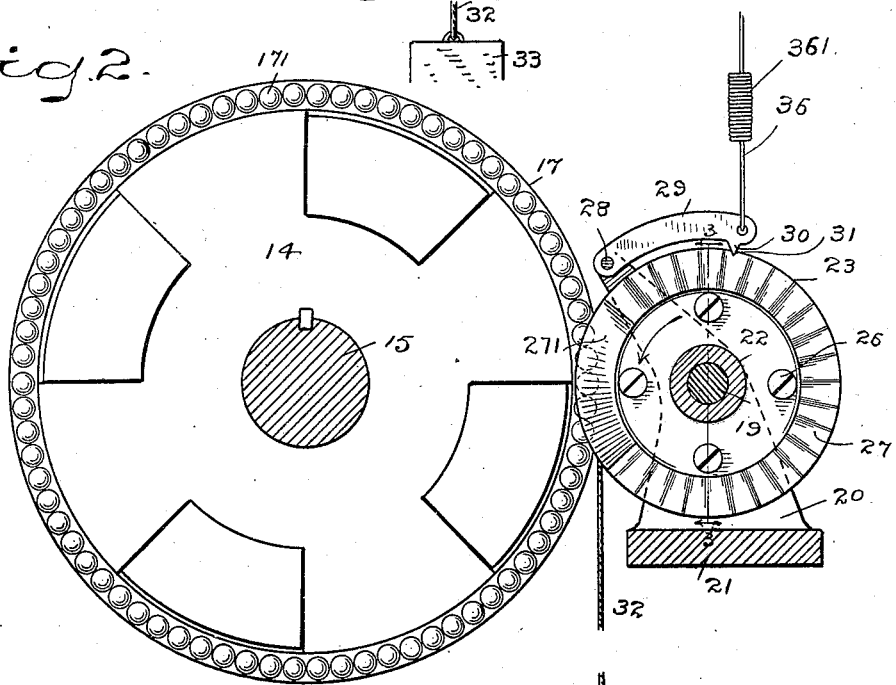
WITNESSES
H. A. Lamb.
S. W. Atherton
INVENTOR
Desire A. Brennan
BY
A. M. Wooster
ATTORNEY No. 828,454. PATENTED AUG. 14, 1906.
D. A. BRENNAN.
SAFETY DEVICE FOR MACHINERY.
APPLICATION FILED JULY 18, 1905.

2 SHEETS—SHEET 2.

WITNESSES
H. A. Lamb
S. W. Atherton

INVENTOR
Desire A. Brennan
BY
A. M. Wooster
ATTORNEY

UNITED STATES PATENT OFFICE.

DESIRE A. BRENNAN, OF ANSONIA, CONNECTICUT, ASSIGNOR TO BIRMINGHAM IRON FOUNDRY, OF DERBY, CONNECTICUT, A CORPORATION OF CONNECTICUT.

SAFETY DEVICE FOR MACHINERY.

No. 828,454.     Specification of Letters Patent.     Patented Aug. 14, 1906.

Application filed July 18, 1905. Serial No. 270,181.

*To all whom it may concern:*

Be it known that I, DESIRE A. BRENNAN, a citizen of the United States, residing at Ansonia, county of New Haven, State of Connecticut, have invented a new and useful Safety Device for Machinery, of which the following is a specification.

This invention relates to safety appliances designed to effect the stoppage of machinery in case of an accident that is liable to result either in injury to a human being or damage to the machinery or to the work being performed thereby.

The object of my invention is to provide an improved device which will be rendered operative by a slight pull or tension upon any part of a cord, rope, or chain conveniently located for instant access, and which device when once rendered operative by such slight pull will act with absolute certainty to disconnect the power from the machine to which the invention is applied.

To these ends the invention consists in the construction and combination of parts substantially as hereinafter described and claimed.

Figure 3:
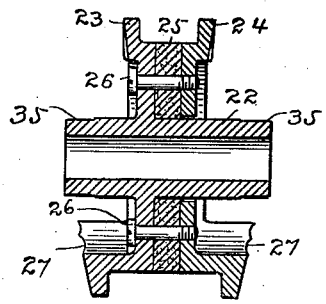
Figure 4:
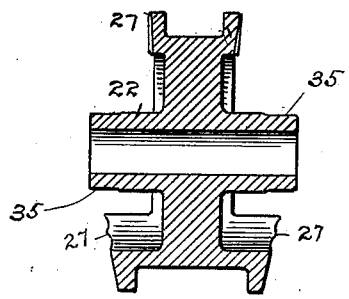
Figure 5:
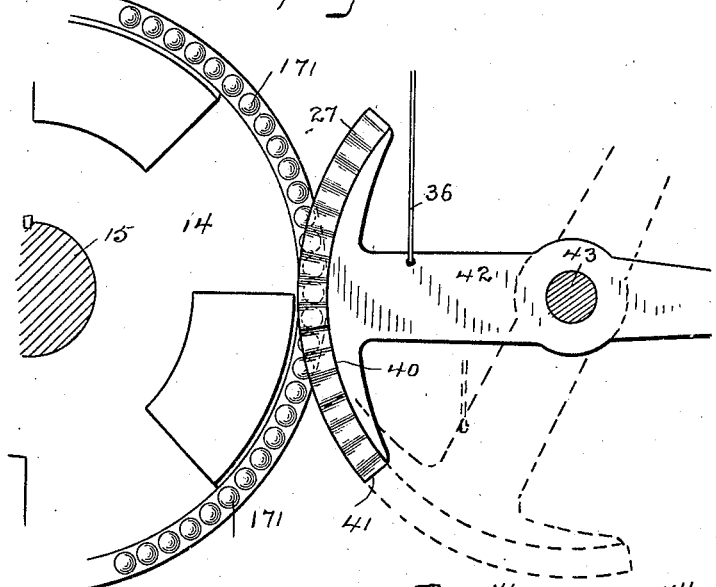
Figure 6:
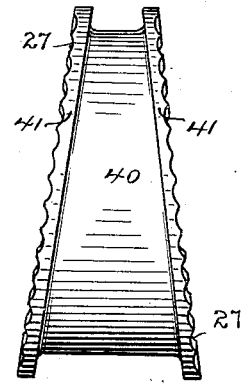
Figure 7:
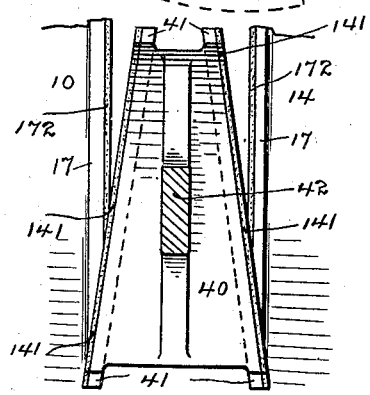

Of the accompanying drawings, Figure 1 represents a front elevation of my improved appliance in one of its embodiments as used in connection with a well-known form of jaw-clutch. Fig. 2 represents a side elevation of the same looking from the left of Fig. 1. Fig. 3 represents a section on line 3 3 of Fig. 2. Fig. 4 represents a section similar to Fig. 3, but illustrating a modification hereinafter described. Fig. 5 is a view similar to portions of Fig. 2, but illustrating another modification hereinafter described. Fig. 6 represents an elevation of the front or face of the oscillating wedge shown in Fig. 5. Fig. 7 is a detail front elevation corresponding with Fig. 5, except that the engaging surfaces are faced with rubber or leather instead of being provided with teeth or projections.

Similar reference characters indicate the same or similar parts throughout the several views.

The principle on which my device or appliance operates is that of a wedge which once placed in operative contact with two parts of a clutch will be actuated by the clutch itself to instantly, positively, and forcibly separate the clutch members.

A jaw-clutch of an ordinary form is shown in Fig. 1, said clutch comprising the member 10, having a hub 11 secured to the driven shafting 12 by a bolt 13. If the clutch be of the type in which the driven member is provided with a gear, then said member 10 would be mounted to rotate on the shaft 12. Hence in describing my invention I shall refer to the member 10 as the driven element. The driving element comprises the member 14 of the clutch, the two members being provided with suitable jaws which intermesh when in the position shown in Fig. 1. The member 14 is mounted to slide on, but to be rotated by, a shaft 15 in alinement with the shaft 12, to which shaft 15 the power to run the machine is applied. Said member is formed with an annular groove 16 to receive the fork of an ordinary clutch-shifting lever. (Not shown.) So far the construction is ordinary and forms no part of my invention.

Integral with or secured to the peripheries of the two clutch members are two flanges 17, provided with engaging surfaces, which may be teeth 171, as shown in Figs. 1, 2, and 5, or friction-strips 172, which may be of rubber or leather, as shown in Fig. 7, the teeth or friction-strip on the flange of one member facing the teeth or friction-strip on the flange of the other member.

In the form illustrated in Figs. 1 to 4, inclusive, the device or appliance for acting on the flanges 17 to force or wedge them apart is supported to rotate freely on a shaft 19, mounted in arms or uprights 20, rising from a base 21, said base being adapted to be secured to or supported by any suitable structure adjacent to the clutch. Said device comprises, as shown in Figs. 1, 2, and 3, a rotary wedge consisting of a sleeve 22, having a flange 23, the periphery of which is formed as a spiral, a disk 24, the periphery of which is formed as a spiral having a pitch opposite to that of flange 23, an intermediate disk of rubber or other compressible material 25, and screws 26, passing loosely through flange 23 and disk 25 and screwed into the disk 24. The outer faces of the edges of the flange 23 and disk 24 are formed with recesses 27, adapted to be engaged by the teeth 171 of the flanges 17, as hereinafter described.

The uprights 20 are extended beyond the periphery of the rotary wedge and are connected by a rod 28, on which is pivoted an arm 29, having a tooth 30, adapted to fit a notch 31, formed in the periphery of the rotary wedge. The arm 29 and tooth 30 form a detent pawl or catch to prevent rotation of the wedge when the tooth 30 is in the notch 31.

On the drum formed by the surface of the rotary wedge between its spiral portions is wound a cord, chain, or rope 32, having one end secured to such drum and its other end provided with a weight 33. The said cord is wrapped in a direction to cause the weight 33 to have a tendency to rotate the wedge in the direction of the arrow in Fig. 2.

The rotary wedge being loose on the shaft 19 is free to move laterally or slide in the direction of the axis of said shaft. A spring 34 between the disk 24 and an upright 20 tends to hold the wedge toward the left, as shown in Fig. 1. The ends of the sleeve 22 are made angular, as at 35, to enable a wrench to be used to disengage the wedge from the clutch-flanges when it is to be returned to normal or inoperative position. Both ends are made angular, although one is within the spring 34, because it is sometimes desirable to mount the appliance in a manner that requires the reversal of the wedge.

As shown in Fig. 2, the cam-shaped spirals of the rotary wedge are formed with smooth portions, as at 271—that is, there are no recesses 27 at the narrower portions of the wedge—and when the tooth 30 of the detent-pawl is in the notch 31 the rotary wedge is held thereby in the position shown in said figure; but when a slight pull is exerted on the cord, wire, or rope 36, which is connected to the pawl, the tooth is released from the notch 31 and the weight 33, acting through cord 32, instantly rotates the wedge until the first recesses 27 are engaged by the teeth 171 of the rotating clutch, and thereby the wedge is forcibly rotated until its widest portion separates the two members of the clutch to stop the machinery. As the wedge rotates it shifts laterally or slides on the shaft 19 toward the right of Fig. 1 against the force of spring 34, because the toothed flange 17 of the fixed clutch member 10 has no lateral movement. When the wedge has made one rotation, the clutch members have been completely separated and the spring 34 returns the wedge to the left, where its rotation will be stopped by engagement of the flanges 23 and 17. After this the parts can be reset in the position shown in Fig. 2, and the machinery can be started up when desired by reëngagement of the clutch members in the usual manner.

The connection 36 is represented as a wire having a portion coiled to form a spring, as at 361, so that no sudden or violent pull on said connection, such as might happen in case of some accident or emergency, would be liable to break it. Said connection may lead over suitable pulleys to any location relatively to the machinery or may completely surround such machinery or have branch connections.

The elastic disk or section 25 of the wedge permits the members 23 and 24 to approach each other when they are first bitten or grasped by the toothed clutch-flanges, and thus prevents such shock or jar as might have a tendency to break any portions of the engaging parts. Said elastic disk 25 may be omitted, however, and the rotary wedge and sleeve made of a single casting, as represented in Fig. 4.

Instead of providing for the complete rotation of the wedge it may be mounted and arranged to oscillate. For instance, as shown in Figs. 5 and 6, the wedge may comprise a segment 40, having oppositely-inclined faces or flanges 41, formed with recesses 27, the same as the rotary wedge described, and adapted to engage or be engaged by the teeth 18 of the clutch-flanges. Said segment is carried by a lever or arm 42, mounted on a stud or shaft 43 and adapted to normally rest or depend in the position indicated by dotted lines. The cord, wire, or chain 36 is connected directly to the arm 42 and leads to any convenient or preferred point or points. When said cord is pulled, the narrow end of the oscillatory segmental wedge is engaged between the toothed clutch-flanges and carried upward until its widest portion separates the two members of the clutch in the same manner as above described in connection with the form or embodiment shown in Fig. 2.

Instead of providing the flanges 17 of the clutch members and the flanges of the wedge with interengaging teeth and depressions said engaging surfaces may be provided with friction-strips 172 and 141, respectively, as shown in Fig. 7, in which I have shown the friction-strips as applied to an embodiment of the invention in which the disengagement of the clutch members is effected by a partial rotation only of the wedge. It will be understood, however, that friction-strips may be used instead of engaging teeth or depressions upon the other form of the invention as well.

It will now be seen that I have provided a wedge device having a path of motion which is in the direction of the length of the faces of said wedge and intersects the path of motion of the faces of the clutch-flanges at what may be termed a "tangent," although in the forms illustrated the wedge-faces move in a curved path. Obviously, however, the wedge-faces might be constructed and arranged to move in a path more closely resembling a true tangential path of intersection of the clutch-flanges or even in the path of an exact tangent.

Having now described the operation of my invention and some of the forms in which it may be embodied, although without attempting to illustrate or describe all of its forms or utilities, what I claim is—

1. The combination with the separable members of a clutch, of a wedge movable in the direction of the length of its operative faces and having its said faces provided with engaging surfaces adapted to coöperate with parts of said clutch, whereby the wedge may be driven by the clutch to disconnect its members.

2. The combination with a wedge having its operative faces toothed or serrated, of a clutch having portions to engage said wedge to drive it, the said wedge being movable substantially in a direction parallel to a tangent to the portions of the clutch which engage it.

3. The combination with the separable members of a clutch, of a wedge mounted on a stud or shaft and movable in the direction of the length of its operative faces and having its said faces toothed or serrated, the said operative faces of the wedge diverging in the direction of the periphery of the wedge for the purpose set forth.

4. The combination with the separable members of a clutch having flanges, of a wedge mounted adjacent thereto and movable substantially in a direction parallel to a tangent between said flanges to spread them and disconnect the clutch, the operative faces of the wedge diverging in the direction of the periphery of the wedge.

5. The combination with the separable members of a clutch having toothed or serrated portions facing each other, of a wedge movable substantially in a direction parallel to a tangent between said toothed portions of the clutch and having toothed or serrated faces adapted to engage between the toothed portions of the clutch to spread them and disconnect the clutch.

6. The combination with the separable members of a clutch having peripheral flanges the opposing faces of which are toothed or serrated, of a wedge mounted on a stud or shaft and having its acting portions toothed or serrated to engage the flanges of the clutch.

7. The combination with the separable members of a clutch, of a wedge movable in the direction of the length of its operative faces and having its said faces toothed or serrated and adapted to coöperate with parts of said clutch to be actuated thereby to disconnect the clutch, and means to manually start the engagement of the wedge and clutch parts, whereby the rotation of the clutch will drive the wedge to disconnect the clutch.

In testimony whereof I affix my signature in presence of two witnesses.

DESIRE A. BRENNAN.

Witnesses:
FRANK M. CANFIELD,
NICHOLAS J. PHELAN.